US008769863B2

(12) United States Patent
Baker

(10) Patent No.: US 8,769,863 B2
(45) Date of Patent: Jul. 8, 2014

(54) CONTROLLABLE SUSPENSION FISHING LURE

(76) Inventor: Greg Baker, Whitter, CA (US)

( * ) Notice: Subject to any disclaimer, the term of this patent is extended or adjusted under 35 U.S.C. 154(b) by 541 days.

(21) Appl. No.: 13/066,826

(22) Filed: Apr. 26, 2011

(65) Prior Publication Data

US 2012/0272563 A1 Nov. 1, 2012

(51) Int. Cl.
*A01K 85/00* (2006.01)
(52) U.S. Cl.
USPC .......................................... 43/42.22; 43/42.15
(58) Field of Classification Search
USPC ............ 43/42.22, 42.11, 42.15, 42.24, 44.92, 43/42.36, 42.35, 42.39
See application file for complete search history.

(56) References Cited

U.S. PATENT DOCUMENTS

| 2,069,972 | A | * | 2/1937 | Schroeder | 43/42.15 |
| 2,598,360 | A | * | 5/1952 | Cummins | 43/42.08 |
| 3,091,883 | A | * | 6/1963 | Hufford | 43/42.08 |
| 3,490,165 | A | * | 1/1970 | Thomassin | 43/42.09 |
| 4,257,182 | A | * | 3/1981 | Thom | 43/42.06 |
| 6,671,996 | B1 | * | 1/2004 | Ito | 43/42.31 |
| 2006/0168875 | A1 | * | 8/2006 | Brzozowski | 43/44.9 |
| 2010/0287812 | A2 | * | 2/2010 | Hughes | 43/42.15 |
| 2010/0146837 | A1 | * | 6/2010 | Zernov | 43/42.15 |

* cited by examiner

*Primary Examiner* — Kimberly Berona
(74) *Attorney, Agent, or Firm* — Roy A. Ekstrand

(57) ABSTRACT

A fishing lure includes a plurality of segments flexibly joined by a flexible line linkage to form a substantially linear array of segments. One or more fish hooks are secured to one or more of the segments. A fish line attachment is provided at the front most segment of the linear array. A plurality of angled slots are formed between each segment due to the spaced linear array. Each segment defines an internal buoyancy chamber and one or more vent apertures are provided which control the flow of water into the buoyancy chambers when the fishing lure is emerced. The lure provides a variety of travel paths and performance under the control of the user through manipulation of the attached fishing line.

13 Claims, 5 Drawing Sheets

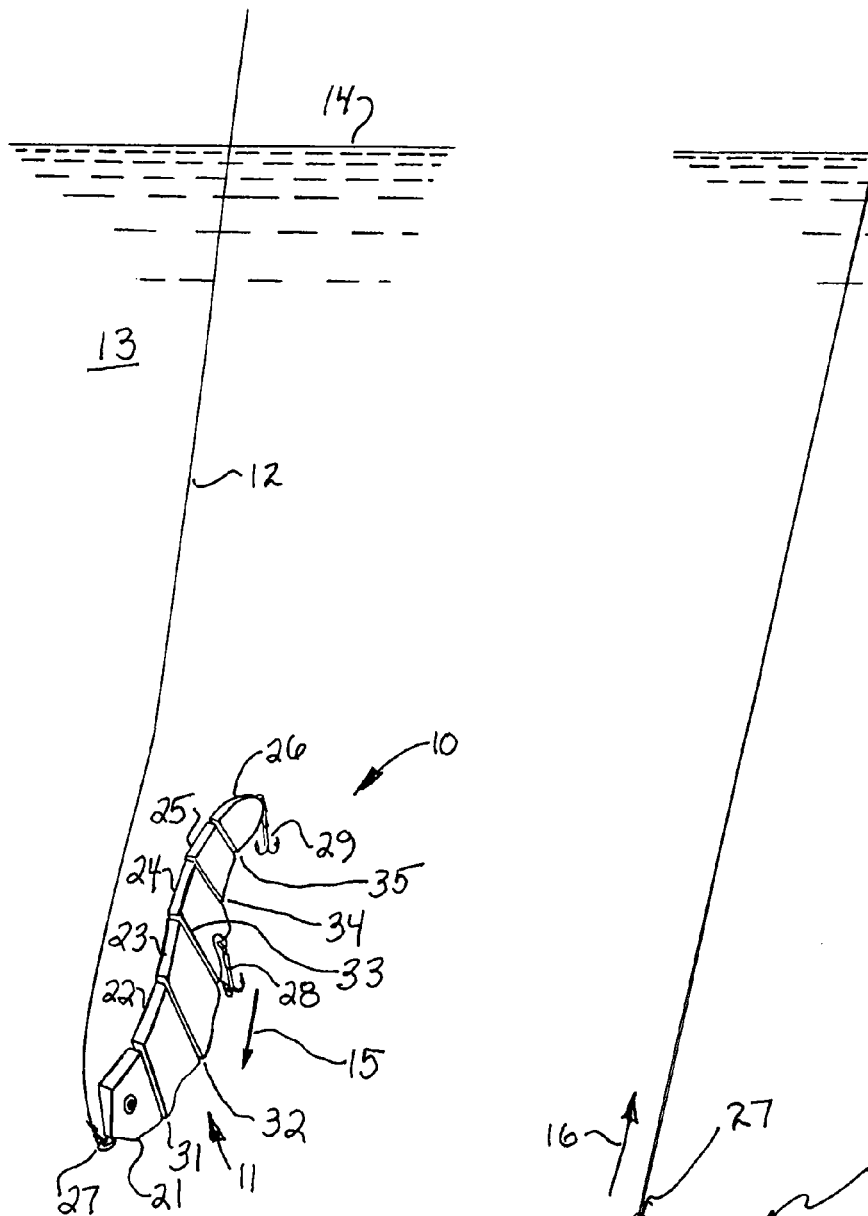
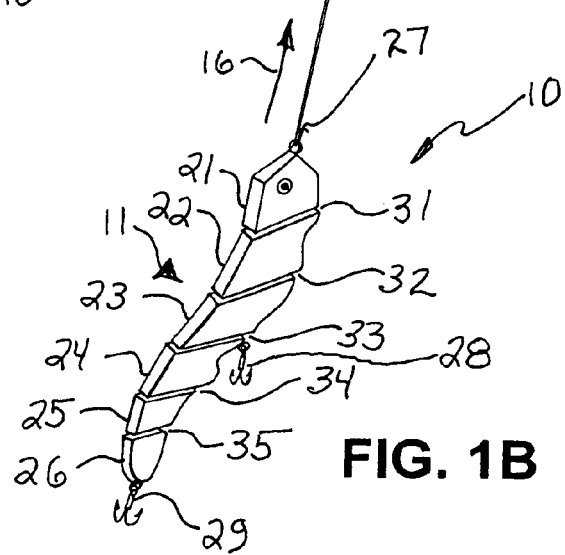
FIG. 1A
FIG. 1B

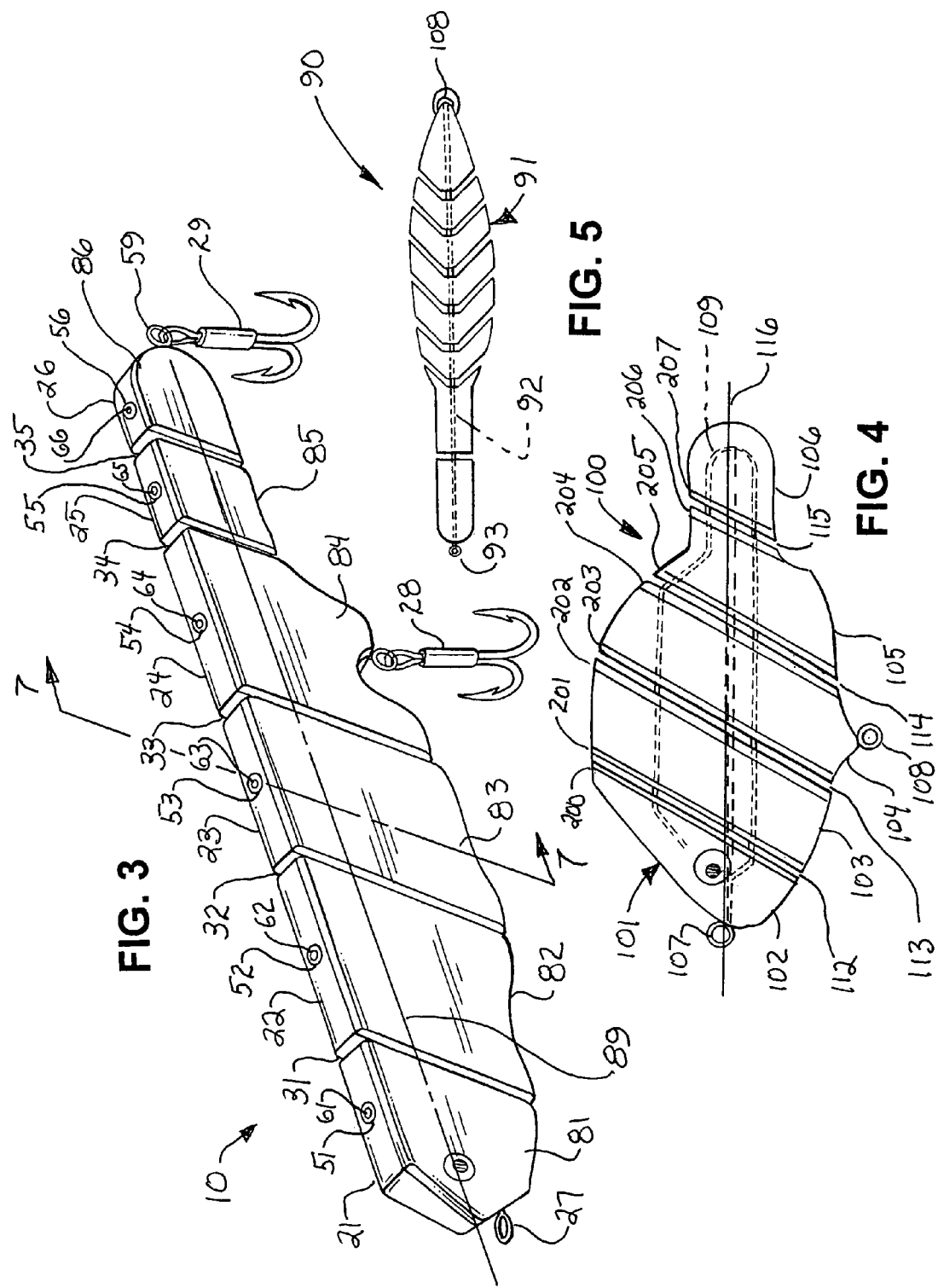

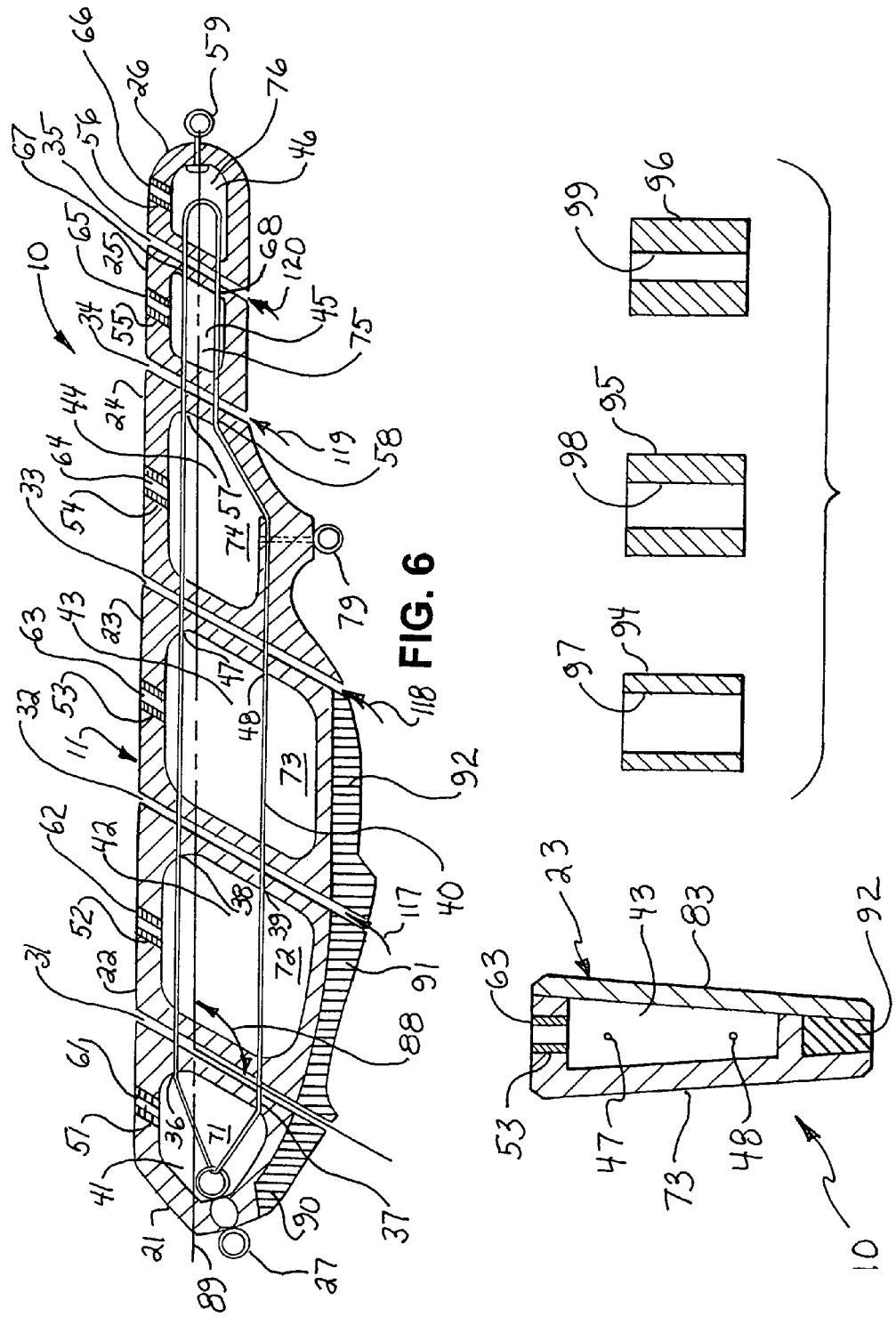

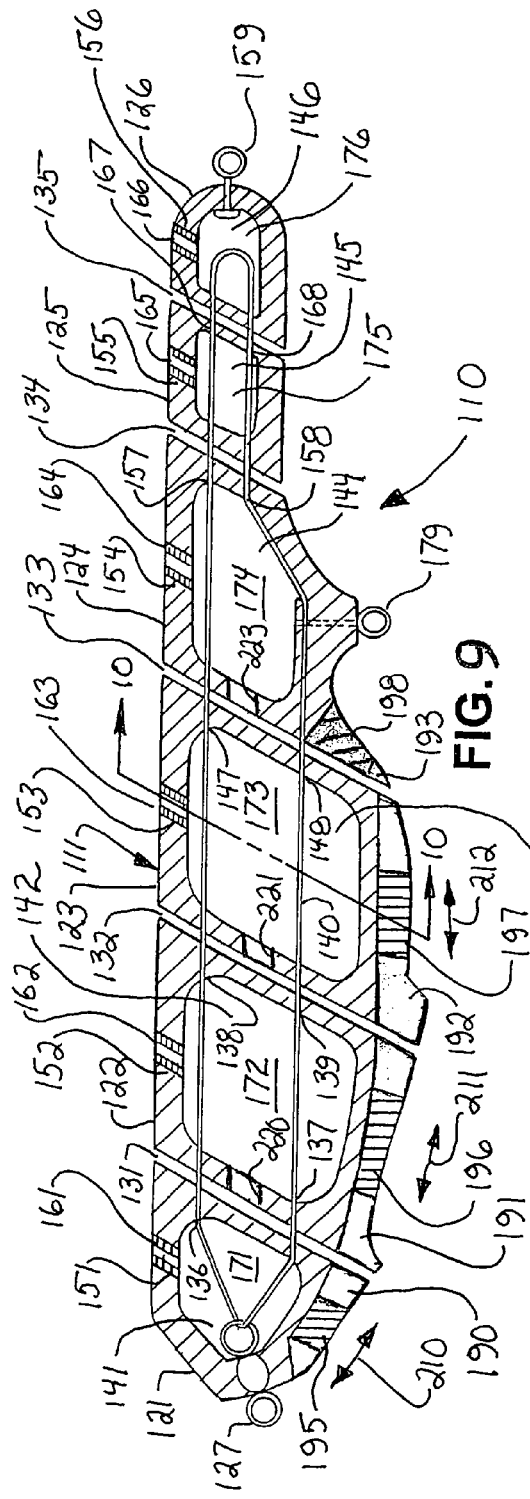
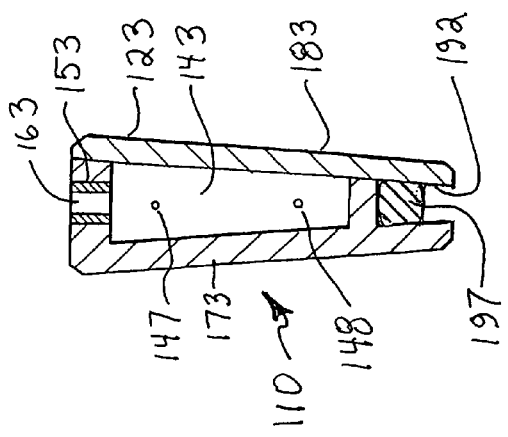
FIG. 9
FIG. 10

CONTROLLABLE SUSPENSION FISHING LURE

FIELD OF THE INVENTION

This invention relates generally to fishing activities such as sport fishing or the like and particularly to fishing lures which are typically cast out into a body of water and thereby retrieved in a reeling-in action.

BACKGROUND OF THE INVENTION

Fishing is an ancient and well known activity which has been widely practiced in virtually all civilizations in which access is obtained to bodies of water, rivers, lakes, oceans, ponds and the like. From earliest times, people have fished to provide a valuable source of food and nutrition. Today, much of the fishing utilized is commercial in nature and is directed toward the harvest of large food supplies from the ocean or other bodies of water. Thus, for the most part, commercial fishing may be characterized as large volume, highly efficient operations in which multiple lines bearing multiple fish hooks are typically employed or in which extensive nets are used to capture large volumes of fish. The clear objective of commercial type fishing is to maximize the volume and weight of fish harvested.

Sport fishing, on the other hand, has developed along other lines and is typically not directed to large volume harvesting. Rather, sport fishing often focuses on the challenge and difficulty of catching fish in a particular environment rather than maximizing the catch. Sport fishing often utilizes a variety of fishing lures which have become popular and extensive. In a typical sport fishing activity of the type to which the present invention is most generally directed, the user employs a long flexible rod which supports a casting or spinning type reel. The reel supports a quantity of fishing line which is guided from the reel to the end of the fishing rod by a plurality of eyelets positioned along the length of the fishing rod. A fishing lure supporting a plurality of fish hooks is secured to the end of the fishing line.

The activity of casting type sport fishing is carried forward as the user employs the rod to impart energy to the lure in a whip-action casting motion which projects the lure and trailing fishing line outwardly to the body of water. Often, the user attempts to exercise some accuracy in casting and intends to target a particular area or portion of the body of water. Additionally, the user often desires to operate the fishing lure within a selected range of water depth. Once the lure has been successfully cast to the desired area and has reached the desired depth, the user then retrieves the lure by reeling in the fishing line causing the lure to "swim" back to the user. The object of this activity is to prompt a fish within the water to strike or attack the lure under a deception or motivation created by the lure and its activity.

The great popularity of casting-type sport fishing has prompted practitioners in the art to develop a substantial variety of fishing lures and other similar apparatus. Within this variety, some lures are fabricated to resemble prey creatures in appearance. Other types of lures employ one or more highly reflective surface portions intended to "flash" using ambient light within the water as the lure spins or moves prompting a fish to quickly strike the lure. Other types of fishing lures are fabricated of flexible rubber-like material to resemble prey which has a given shape and skin characteristic. Still other types of fishing lures utilize articulated bodies formed of a plurality of body segments joined by pivotal attachments. The objective of such lures is to provide a swimming action on the part of the lure due to its segmented fabrication.

In addition to a variety of fabrications provided by practitioners in the art relating to the appearance and action of fishing lures, other improvements have been provided by practitioners which are directed to the performance of the lures within the water. For example, many fishing lures generally referred to as "top water baits" are fabricated with sufficient buoyancy to swim at or near the water surface and are constructed to implement a side-to-side zigzag" travel path when the user abruptly jerks the fishing rod to quickly accelerate the lure in the water. Still other fishing lures have been fabricated in a manner which provides a predetermined total buoyancy utilizing various materials and often employing metal weights to achieve a predetermined depth level of operation by the lure as it is reeled in by the user.

While the foregoing described prior art fishing lures have to some extent improved the art and have in some instances enjoyed commercial success, there remains nonetheless a continuing and unresolved need in the art for evermore improved fishing lures. There remains a particular unresolved need in the art for improved fishing lures which exhibit greater controllability when operating within the water.

SUMMARY OF THE INVENTION

Accordingly, it is a general object of the present invention to provide an improved fishing lure suitable for casting-type sport fishing. It is a particular object of the present invention to provide an improved fishing lure which is operable in novel actions and which exhibits control of depth of operation and movements obtained during the reeling-in process. It is a still more particular object of the present invention to provide an improved fishing lure which exhibits a variety of travel paths under user control and manipulation.

In accordance with the present invention, there is provided a fishing lure comprising a plurality of body segments each defining an internal buoyancy chamber, a forward edge, a rearward edge, a top edge and a bottom edge; at least one flexible line joining the body segments in a spaced generally linear array to form a lure body characterized by a plurality of body slots formed between rearward and forward edges of adjacent ones of the body segments and defining a primary front-to-back axis; a first plurality of vent apertures formed in selected ones of the body segments in communication with the buoyancy chambers; at least one fish hook attached to at least one of the body segments; and a fishing line attachment secured to one of the body segments; the forward and rearward edges of the body segments being angled with respect to the primary front-to-back axis.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIGS. 1A and 1B set forth respective perspective views of a fishing lure constructed in accordance with the present invention in a descending and ascending movement respectively;

FIG. 3 sets forth a perspective view of a fishing lure constructed in accordance with the present invention;

FIG. 4 sets forth a side elevation view of an alternative embodiment of the present invention fishing lure;

FIG. 5 sets forth a top view of a further alternate embodiment of the present invention fishing lure;

FIG. 6 sets forth a section view of the present invention fishing lure shown in FIG. 3;

FIG. 7 sets forth a section view of the present invention fishing lure shown in FIG. 3 taken along section lines 7-7 therein;

FIG. 8 sets forth section views of alternative chamber vents for use in the present invention fishing lure;

FIG. 9 sets forth a section view of an alternate embodiment of the present invention fishing lure; and FIG. 10 sets forth a section view of the present invention fishing lure shown in FIG. 9 taken along section lines 10-10 therein.

DESCRIPTION OF THE PREFERRED EMBODIMENTS OF THE INVENTION

Figure 2:
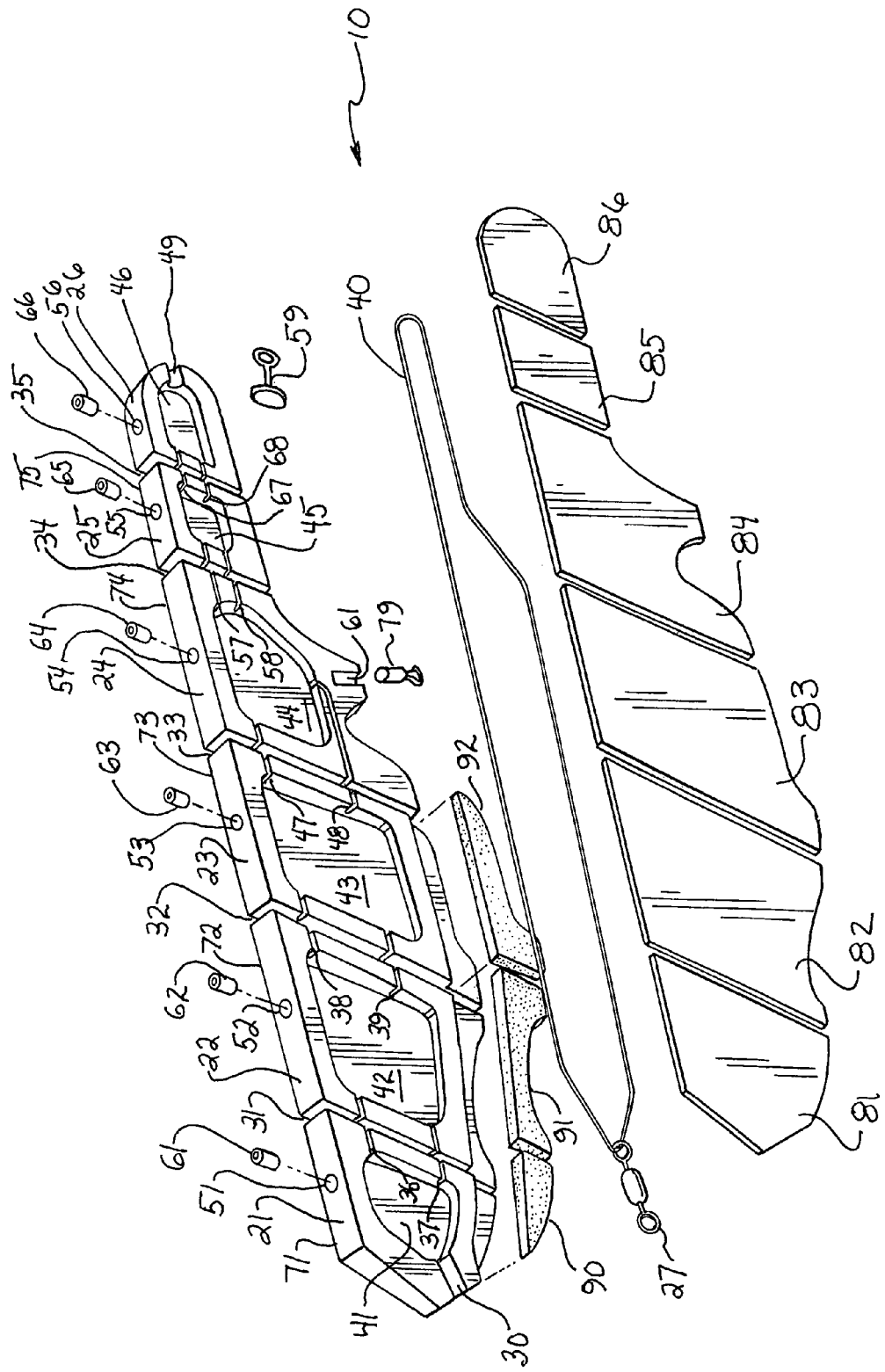
FIG. 2 sets forth a perspective assembly view of a fishing lure constructed in accordance with the present invention.

FIGS. 1A and 1B sets forth perspective views of a controllable fishing lure constructed in accordance with the present invention and generally referenced by numeral 10. Fishing lure 10 is shown in FIG. 1A in a sinking posture as the fishing lure descends into a body of water 13 having a surface 14. In contrast, FIG. 1B sets forth fishing lure 10 in an ascending posture as the lure is drawn upwardly toward surface 14.

More specifically and with simultaneous reference to FIGS. 1A and 1B, lure 10 includes an elongated body 11 formed of a plurality of body segments 21, 22, 23, 24, 25 and 26 arranged in a linear array. By means set forth below in greater detail, segments 21 through 26 are connected by a flexible line (seen in FIG. 2) in a spaced arrangement which provides flexibility for body 11 and which creates a plurality of slots or spaces between adjacent body segments. Thus, a slot 31 is formed between segments 21 and 22 while a similar slot 32 is formed between segments 22 and 23. Similarly, a slot 33 is formed between segments 23 and 24 while a slot 34 is formed between segments 24 and 25 and finally a slot 35 is formed between segments 25 and 26. It will be apparent from the discussions and descriptions which follow that the size of slots 31 through 35 is selectable to provide the desired flexibility and extent of flexing between body segments. Suffice it to note here that slots 31 through 35 are sufficient to provide substantial flexibility of body 11. It will also be noted that slots 31 through 35 are angled with respect to the primary access (seen in FIG. 3) of body 11. The importance and structural detail of the angular disposition of slots 31 through 35 is described below in greater detail. However, suffice it to note here that in accordance with an important aspect of the present invention, the angled characteristics of slots 31 through 35 within body 11 provides a novel control and novel performance for fishing lure 10 within a body of water such as water 13.

Segment 21 further includes a line attachment 27 on the forward position thereof. Line attachment 27 is secured to a conventional fish line 12 which extends to the rod and reel utilized by the user (not shown). In addition to attachment 27, body 11 further supports a plurality of hooks such as hooks 28 and 29. It will be apparent to those skilled in the art that while hooks 28 and 29 shown for purposes of illustration as two pronged hooks, conventional three pronged treble hooks may be utilized without departing from the spirit and scope of the present invention.

It operation, the user initially casts lure 10 across water surface 14 in a generally conventional casting action allowing lure 10 to penetrate surface 14 and descend downwardly in the direction indicated by arrow 15. In accordance with the present invention and in accordance with the performance of fishing lure 10 described below in greater detail, the user is able to impart substantial control to fishing lure 10 including selection of lure depth of operation, pattern of lure movement and swimming action of the fishing lure by exercising control via line 12. In FIG. 1B lure 10 is shown being withdrawn from water 13 as line 12 is used to draw lure 10 upwardly in the direction indicated by arrow 16. In accordance with the range of motion shown in FIGS. 1A and 1B, and in the manner described below in greater detail, the present invention fishing lure is capable of operation near surface 14 of water 13 and is capable of being allowed to descend to a desired depth or, if chosen, to the body (not shown) of the body of water. In further accordance with the fabrication of the present invention described below in greater detail, the buoyancy both as to total buoyancy and center of buoyancy of the present invention fishing lure are both adjustable to add greater flexibility to the present invention fishing lure.

In the operation of the present invention fishing lure, the user simply casts lure 10 out across water surface 14 allowing lure 10 to fall upon surface 14. If the user chooses not to pull on line 12, lure 10 will in accordance with the fabrication set forth below right itself initially and thereafter spiral downwardly ending up upon the bottom of the water surface while maintaining an upright position. In the event the user desires to swim lure 10 at or near water surface 14 the user lowers the fishing rod and line 12 into the water and applies quick jerking motions together with steady reeling in of line 12. Under this stimulus, lure 10 swims near surface 14 in a back and forth zig zag travel pattern. In the event the user desires to select a particular depth within water 13 to operate lure 10, the user allows lure allows lure 10 to sink to the desired depth and thereafter applies constant reeling pressure drawing lure 10 home without exerting any rapid jerking movement. Under this stimulus and drive, lure 10 swims in a fish-like action toward the user. Other variations of the operation of the present invention fishing lure and the structure which provides them is set forth below in greater detail.

FIG. 2 sets forth a perspective assembly view of fishing lure 10. It will be noted that fishing lure 10 shown in FIG. 2 includes a total of six segments (segments 21-26). However, it will be equally apparent to those skilled in the art that the present invention fishing lure may be manufactured using a greater or lesser number of segments (see for example FIGS. 4 and 5) without departing from the spirit and scope of the present invention. It will be further noted that the number of flexible line linkages between segments may also be varied. Fishing lure 10 shown in FIG. 2 uses a pair of linkages between segments (see flexible line 40) while fishing lure 100 shown in FIG. 4 uses three linkages (see flexible line 109) and fishing lure 90 shown in FIG. 5 uses a single linkage (see flexible line 92).

More specifically, fishing lure 10 includes an elongated body 11 formed of a linear array of segments 21, 22, 23, 24, 25 and 26. Segments 21 through 26 are arranged in an linear array to define a generally fish-like silhouette. Segments 21 through 26 are joined by a flexible line 40 having an attachment 27 at the forward end thereof. Segments 21 through 26 are positioned within this linear array to define a plurality of slots 31, 32, 33, 34 and 35 between adjacent segments within the linear array. Segment 21 defines a vent aperture 51 receiving a vent plug 61. Segment 21 further includes a passage 30 which receives attachment 27. Segment 21 also defines an interior buoyancy chamber 41 which is in communication with vent aperture 51. Correspondingly, segment 22 defines a vent aperture 52 receiving a vent plug 62 and defining an interior buoyancy chamber 42. By further similarity, segment 23 defines a vent aperture 53 receiving a vent plug 63. Segment 23 further defines an interior buoyancy chamber 43. Segment 24 defines a vent aperture 54 receiving a vent plug 64 and a buoyancy chamber 44. Segment 25 defines a vent aperture 55 receiving a vent plug 65. Segment 25 further defines a buoyancy chamber 45. Finally, segment 26 defines a vent aperture 56 receiving a vent plug 66. Segment 26 further defines a buoyancy chamber 46 and a passage 49.

To facilitate the attachment of flexible line 40 to segments 21 through 26, a plurality of passages are formed between adjacent segments. Thus, passages 36 and 37 extend between segments 21 and 22 while passage 38 and 39 extend between segments 22 and 23. Similarly, passages 47 and 48 extend between segments 23 and 24 while passages 57 and 58 extend between segments 24 and 25. Finally, passages 67 and 68 extend between segments 25 and 26. An attachment 59 suitable for supporting a hook is received within passage 49 while a similar attachment 79 is received within a passage 61 formed in segments 26 and 24 respectively. A plurality of generally flat plates 71 through 76 are secured to one side of segments 21 through 26. Plates 71 through 76 conform generally to the silhouettes of their respective segments 21 through 26 and are secured in a water tight attachment using adhesive or the like.

In the assembly of lure 10, plates 71 through 76 are secured to segments 21 through 26 respectively using a water tight adhesive attachment or other fabrication. Thereafter, attachment 27 is positioned within passage 30 and a sealing attachment is deposited within passage 30. Attachment 79 is similarly secured within passage 61 using a conventional adhesive. Attachment 59 is similarly secured within passage 49. A deposit of water tight adhesive is applied to attachments 27, 79 and 59 within passages 30, 61 and 49 respectively to provide a sealed water tight attachment. Thereafter, flexible line 40 is threaded through passages 36, 38, 47, 57, 67, 68, 58, 48, 39 and 37 in the manner shown in FIG. 6 to provide the coupling of segments 21 through 26 in the spaced apart arrangement desired. The extent of slots 31 through 35 is determined by the spacing set in the attachment of segments 21 through 26 as flexible line 40 is secured within the above-mentioned passages between the segments. The attachment is completed utilizing a water tight adhesive which is deposited within the inter segment passages and provides the dual action of securing flexible line 40 to segments 21 through 26 and maintaining the water tight integrity of buoyancy chambers 41 through 46. The fabrication of fishing lure 10 is completed by attaching plates 81 through 86 to segments 21 through 26 (seen in FIG. 3) again utilizing a water tight adhesive material. Once plates 81 through 86 are secured to segments 21 through 26, the space formed beneath segments 21, 22 and 23 is filled by securing fill plugs 90, 91 and 92 respectively therein. Fill plugs 90, 91 and 92 may be formed of a buoyant material such as wood or the like or alternatively, may be formed of a material whose buoyancy differs from the material used to fabricate body 11 of fishing lure 10. For example, fill plugs 90, 91 and 92 may utilize a heavier material or in some instance a metal material to provide a selected buoyancy of body 11 and a selected center of buoyancy of the resulting structure. This attachment of fill plugs 90, 91 and 92 is completed utilizing a water tight adhesive. Finally, a suitable pair of fish hooks such as a conventional treble hook or other suitable hook structure is secured to attachments 59 and 79 to complete the structure shown below in FIG. 3.

In accordance with an important aspect of the present invention shown in the embodiment of FIG. 2, vent apertures 51 through 56 are in communication with buoyancy chambers 41 through 46. Vent plugs 61 through 66 are received within vent apertures 51 through 56 in a removable attachment allowing the vent plugs to be changed as the user desires. As is better seen in FIG. 8, vent plugs 61 through 66 are preferably fabricated to define a passage there through. As is also better seen in FIG. 8, and in accordance with an important aspect of the present invention, vent plugs 61 through 66 may be selected from a variety of vent plugs each having a different diameter vent passage there through. As a result, the user is able to set the effective vent passage for each of segments 21 through 26 by inserting a particularly selected vent plug. In this manner, the user is able to set a desired water fill rate for buoyancy chambers 41 through 46 which, as is described below in greater detail, contributes to a desired performance characteristic of the present invention fishing lure. Suffice it to note here that the speed at which buoyancy chambers 41 through 46 fill with water as lure 10 is immersed is controlled to some extent by the vent plugs selected for the various vent apertures in segments 21 through 26.

It will be apparent to those skilled in the art that fishing lure 10 may be fabricated of a variety of material without departing from the spirit and scope of the present invention. In the anticipated embodiment of fishing lure 10 to be practiced in many environments, the various components forming fishing lure 10 may be fabricated of a suitable wood material. It will be equally apparent to those skilled in the art however; that the components of fishing lure 10 may be fabricated of other suitable materials such as plastics or composites without departing from the spirit and scope of the present invention.

FIG. 3 sets forth a perspective view of fishing lure 10. As described above, fishing lure 10 includes a body 11 formed of a plurality of segments 21 through 26 arranged in a linear array. As is also described above, the arrangement of segments 21 through 26 is characterized by a spacing between each adjacent segment thereby forming a plurality of slots 31 through 35 between adjacent segments. The linear arrangement of segments 21 through 26 provides a primary front to back axis 89. Primary axis 89 is important to understand in the linear arrangement of segments 21 through 26 due to the angled relationship between slots 31 through 35 with respect to primary axis 89. As can be seen in FIG. 3 and as is particularly evident in FIG. 6, slots 31 through 35 do not form right angle relationships with respect to primary axis 89. On the contrary and in accordance with an important aspect of the present invention, slots 31 through 35 are angled with respect to primary axis 89 to form an angular relationship characterized by slots 31 through 35 extending forwardly from top to bottom of the slots.

Fishing lure 10 further includes a pair of attachments 59 and 79 joined to segments 26 and 24 respectively. A pair of conventional fish hooks 29 and 28 are joined to attachments 59 and 79 respectively. Hooks 28 and 29 are fabricated in accordance with conventional fabrication techniques and thus may comprise hooks which utilize a single prong or pointed hook portion or, alternatively, may utilize dual opposed prongs or, as is shown in FIG. 3, may employ conventional three-pronged "treble" type hooks. The type of hook utilized in combination with fishing lure 10 is chosen with respect to various conditions such as the type and size of fish targeted by the user. It will also be apparent to those skilled in the art that the number and placement of hooks upon body 11 of fishing lure 10 may be varied without departing from the spirit and scope of the present invention. Segment 21 further includes an attachment 27 on the frontal portion thereof which is utilized in securing attachment of fishing lure 10 to a fishing line in the manner shown in FIGS. 1A and 1B. This attachment is carried forward in accordance with conventional fabrication techniques and may utilize a conventional leader with attachment clip or a fishing line and may be simply tied to attachment 27 as desired.

In accordance with an important aspect of the present invention, segments 21 through 26 define respective vent apertures 51 through 56 on the upper surfaces thereof. In further accordance with the present invention, vent apertures 51 through 56 receive respective vent plugs 61 through 66. The typical fabrication of vent plugs 61 through 66 is set forth below in FIGS. 6, 7 and 8 in greater detail. However, suffice it to note here that vent plugs 61 each define a passage therethrough which communicates with the interior buoyancy chambers (chamber 41 through 46 seen in FIG. 2) allowing water to enter the buoyancy chambers of fishing lure 10 when the lure is immersed. In accordance with this important aspect of the present invention, the diameter of bore within vent plugs 61 through 66 is capable of variation by switching vent plugs within the various vent apertures of each segment. In this matter, the rate at which water enters the buoyancy chamber of a given segment may be adjusted by simply selecting the appropriate vent plug.

With temporary reference to FIG. 6, it will be noted that segments 21 through 26 are joined by one or more linkages formed of a flexible line or other suitable material. In the embodiment shown in FIG. 6, a pair of linkages are provided by a flexible line 40. It will be apparent however that various combinations of linkages may be utilized without departing from the spirit and scope of the present invention.

Returning to FIG. 3, in the anticipated operation of the present invention fishing lure, an attachment is made to attachment 27 at the end of the controlling fishing line (seen in FIGS. 1A and 1B). Thereafter, lure 10 is cast into a body of water impacting the surface thereof and initially floating upright upon or near the surface. As water enters, the buoyancy chambers within segments 21 through 26 (seen in FIG. 6) the buoyancy of fishing lure 10 is changed and fishing lure 10 begins descending into the water. Of importance with respect to present invention is the flexible coupling between segments 21 through 26 which cooperates with the changing buoyancy of fishing lure 10 to allow fishing lure 10 to descend in the absence of drawing force upon the attached fishing line in a pattern which curves. This curving descent is caused in part by the flexible coupling between segments of fishing lure 10 and the angled character of slots 31 through 35. The filing action provided by vent plugs 61 through 66 creates buoyancy offsets between segments which in turn imparts a curved descent characteristic to the fishing lure. Once fishing lure 10 begins descending into the water, the user is able to impart substantial control to the fishing lure by manipulating the rod and fishing line which is coupled to the fishing lure. As mentioned above, in the absence of the drawing force upon the fishing line, fishing lure 10 initially curves and thereafter spirals downwardly ending up upon the bottom of the water body maintaining an upright position. In the event the user initiates quick jerking movement of the fishing rod and attached fishing line while steadily reeling in fishing line, fishing lure 10 swims near the water surface executing a back and forth zig zag pattern. In addition, and as is also mentioned above, the user is able to select a particular depth for activity by allowing the lure to sink to the desired depth and thereafter apply a constant drawing force upon the line without rapid jerking movement. In this operation, the present invention fishing lure swims in a fish-like action toward the fisherman. My means described below in greater detail, the characteristics of fishing lure 10 may be adjusted to suit particular conditions of operations and particular modes of fishing action.

FIG. 4 sets forth a side elevation view of an alternate embodiment of the present invention fishing lure generally referenced by numeral 100. It will be noted that fishing lure 100 generally resembles fishing lure 10 in that it defines a fish-like silhouette and is fabricated of a plurality of linked segments. It will also be apparent from the descriptions which follow, that fishing lure 100 is somewhat different in construction and that FIG. 4 provides illustration of variations utilized in fabricating the present invention fishing lure.

More specifically, fishing lure 100 includes a plurality of segments 102, 103, 104, 105 and 106 arranged in a generally linear array. It will also be noted that this generally linear array of segments 102 through 106 may be characterized as arranged in general alignment with a primary front to back access 116. A flexible line 109 extends between segments 102 and 106 forming three linkages there between. Thus, in contrast to the dual linkages provided by flexible line 40 in fishing lure 10 (seen in FIG. 6), flexible line 109 provides three flexible linkages between segments 102 and 106. This is illustrative to the anticipated variation of segment linking for the present invention fishing lure which is utilized in achieving variations of performance. It will be recognized that segments 102 through 106 are less able to pivot about primary access 116 having been coupled by three flexible linkages compared to the characteristic pivoting obtainable by segments 21 through 26 having a pair of flexible linkages there between (seen in FIG. 6). In further accordance with the present invention, segments 102 through 106 define edge portions which are angled with respect to primary access 116 in a non-perpendicular angular relationship. Correspondingly, a plurality of angled slots 112 through 115 are created between segments 102 through 106. As described above, the angular characteristic of slots 112 through 115 may be described angling downwardly and forwardly with respect to primary access 116. In addition, a further variation of the present invention fabrication is illustrated in FIG. 4 in that the various segments define chamfered surfaces along their adjacent edges. More specifically, segment 102 defines a chamfered surface 200 along its rear most edge. Similarly, segment 103 defines a pair of chamfered surfaces 201 and 202 along its forward and rearward edge. Correspondingly, segment 104 defines chamfered surfaces 203 and 204 along its forward and rearward edges respectively. Segment 105 also defines chamfered surfaces 205 and 206 along its forward and rearward edges respectively and finally segment 106 defines a chamfered surface 207 along its forward edge. While not seen in FIG. 4, it will be understood that in the preferred fabrication of fishing lure 100 that the opposite side of segments 102 through 106 is a mirror image of the side shown in FIG. 4. Accordingly, it will be understood that the opposite sides of segments 102 through 106 define corresponding chamfered surfaces on their respective edges.

In operation, the chamfered surfaces along the adjacent edges of segments 102 through 106 allow an increased range of bending or flexing between segments for a given spacing there between. Thus, by comparison of FIGS. 3 and 4, it will be apparent to those skilled in the art that for a given spacing between the segments a greater angle of flex between segments is facilitated in the embodiment of FIG. 4 with respect to the embodiment of FIG. 3. This increased angle of flexing is an illustration of the further variation possible with the present invention fishing lure fabrication. Segment 102 further includes an attachment 107 on the forward edge thereof which is utilized in securing attachment of fishing lure 100 to a fishing line. An attachment 108 is secured to segment 104 and is intended to receive a fish hook in a conventional attachment.

FIG. 5 sets forth a top view of a further alternate embodiment of the present invention fishing lure generally referenced by numeral 90. Fishing lure 90 includes a flexible line 92 proving flexible linkage between a plurality of segments forming a body 91. Of importance to note in FIG. 5 is the utilization of a substantially greater number of segments within body 91. Also of note is the utilization of a single flexible linkage formed by flexible line 92. An attachment 93 facilitates the attachment of fishing lure 90 to a fishing line. One or more fish hooks may be secured to body 91 utilizing an attachment 108 extending from the rear most segment of body 91.

FIG. 6 sets forth a section view of fishing lure 10 which is taken along the center line of body 11. It should also be noted that FIG. 6 omits fish hooks 28 and 29 (seen in FIG. 3) as well as attachment of a fishing line to attachment 27.

Fishing lure 10 includes an elongated body 11 formed of a linear array of segments 21, 22, 23, 24, 25 and 26. Segments 21 through 26 are arranged in a linear array to define a generally fish-like silhouette. Segments 21 through 26 are joined by a flexible line 40 having an attachment 27 at the forward end thereof. Segments 21 through 26 are positioned within this linear array to define a plurality of slots 31, 32, 33, 34 and 35 between adjacent segments within the linear array. Segment 21 defines a vent aperture 51 receiving a vent plug 61. Segment 21 further includes a passage 30 which receives attachment 27. Segment 21 also defines an interior buoyancy chamber 41 which is in communication with vent aperture 51. Correspondingly, segment 22 defines a vent aperture 52 receiving a vent plug 62 and defining an interior buoyancy chamber 42. By further similarity, segment 23 defines a vent aperture 53 receiving a vent plug 63. Segment 23 further defines an interior buoyancy chamber 43. Segment 24 defines a vent aperture 54 receiving a vent plug 64 and a buoyancy chamber 44. Segment 25 defines a vent aperture 55 receiving a vent plug 65. Segment 25 further defines a buoyancy chamber 45. Finally, segment 26 defines a vent aperture 56 receiving a vent plug 66. Segment 26 further defines a buoyancy chamber 46 and a passage 49.

To facilitate the attachment of flexible line 40 to segments 21 through 26, a plurality of passages are formed between adjacent segments. Thus, passages 36 and 37 extend between segments 21 and 22 while passage 38 and 39 extend between segments 22 and 23. Similarly, passages 47 and 48 extend between segments 23 and 24 while passages 57 and 58 extend between segments 24 and 25. Finally, passages 67 and 68 extend between segments 25 and 26. An attachment 59 suitable for supporting a hook is received within passage 49 while a similar attachment 79 is received within a passage 61 formed in segments 26 and 24 respectively. A plurality of generally flat plates 71 through 76 are secured to one side of segments 21 through 26. Plates 71 through 76 conform generally to the silhouettes of their respective segments 21 through 26 and are secured in a water tight attachment using adhesive or the like.

In accordance with an important aspect of the present invention described above, slots 31 through 35 are angled downwardly and forwardly with respect to primary access 89 of fishing lure body 11. For example, slot 31 is shown angled with respect to primary access 89 defining an angle 88 there between. It will be noted that slots 32, 33, 34 and 35 form similar angles with respect to primary access 89. In accordance with an important aspect of the present invention, the downward and forward angle defined by slots 31 through 35 provides an unusual and beneficial interaction of fishing lure 10 within the water. Thus, as fishing lure 10 is moved forwardly within the water, the lower portion of the forward edge of each segment within their respective slots engages the water and results in a water flow upwardly into slots 31 through 35. This water flow is illustrated for slots 32 through 35. It will be understood that a corresponding water flow takes places in slot 31 which is not shown to avoid unduly cluttering FIG. 6. Thus, as fishing lure 10 travels forwardly through the water either due to its above-described sinking or descending action or due to a force applied to the attached line, the lower edges of segments 22, 23, 24, 25 and 26 engage the water and create this water flow within slots 31 through 35. This in turn provides a novel characteristic for fishing lure 10 within the water. As segments 21 through 26 flex upon flexible line 40 the degree of engagement between the forward edge of segments 22 through 26 with the water is allowed to change due to the flexible coupling between segments and the angled characteristics of slots 31 through 35.

As mentioned above, the respective bores within vent plugs 61 through 66 control the change of buoyancy within buoyancy chambers 41 through 46 as water enters through the vent plugs. The buoyancy of fishing lure 10 is further variable by selection of the material from which fill plugs 90, 91 and 92 are fabricated. The use of fill plugs formed of a heavier material such as metal dramatically affects the buoyancy characteristics of fishing lure 10. In addition, the use of weighted material such as metal in fabricating fill plugs 90, 91 and 92 also tends to maintain the upright orientation of fishing lure 10 within the water.

FIG. 7 sets forth a section view of fishing lure 10 taken along section lines 7-7 in FIG. 3. Of importance to note in FIG. 7 is the generally trapezoidal cross section provided by segment 23. In the preferred fabrication of the present invention, segments 21 and 22 as well as segments 24, 25 and 26 (seen in FIG. 6) define a similar trapezoidal cross section. Thus, segment 23 of fishing lure 10 is shown having a pair of generally planar plates 73 and 83 secured to segment 23 to define a buoyancy chamber 43 therein. Segment 23 further includes a vent aperture 53 within which a vent plug 63 is received. A fill plug 92 is secured between the lower portions of plates 73 and 83. A pair of passages 47 and 48 passed through chamber 43 to facilitate the attachment of flexible line 40 (seen in FIG. 6).

FIG. 8 sets forth a plurality of vent plugs suitable for insertion within vent apertures 51 through 56 (seen in FIG. 6). Of importance to note in FIG. 8, is that exemplary vent plugs 94, 95 and 96 are shown in section view such that their respective bores 97, 98 and 99 may be shown. Thus, it will be noted that the external diameters of vent plugs 94, 95 and 96 are substantially identical and thus the vent plugs are interchangeable within vent apertures in the manner described above. It will also be noted that the interchangeable character of vent plugs 94, 95 and 96 each of which shows a different diameter 97, 98, and 99 respectively facilitates the control of the effective rate at which water is able to fill the buoyancy chamber of the body segment in which the respective vent plugs are secured. Thus, for example with temporary reference to FIG. 6, it will be noted that replacement of vent plug 61 within vent plug 94 would substantially increase the rate at which buoyancy chamber 41 would fill with water when fishing lure 10 is immersed.

FIG. 9 sets forth a section view of a still further alternate embodiment of the present invention fishing lure generally referenced by numeral 110. Fishing lure 110 will be seen to be substantially similar to fishing lure 10 shown in section view in FIG. 6. However, fishing lure 110 differs from fishing lure 10 in that a plurality of movable weights are shown disposed beneath segments 121, 122 and 123. In addition, comparison of FIGS. 6 and 9 shows that FIG. 9 further differs in that additional vent apertures 220, 221 and 223 are shown to provide further water entrance to the buoyancy chambers of segments 122, 123 and 124 respectively. Apart from these differences, fishing lure 110 is substantially similar to fishing lure 10 described above.

More specifically, fishing lure 110 includes an elongated body 111 formed of a linear array of segments 121, 122, 123, 124, 125 and 126. Segments 121 through 126 are arranged in an linear array to define a generally fish-like silhouette. Segments 121 through 126 are joined by a flexible line 140 having an attachment 127 at the forward end thereof. Segments1 21 through 126 are positioned within this linear array to define a plurality of slots 131, 132, 133, 134 and 135 between adjacent segments within the linear array. Segment 121 defines a vent aperture 151 receiving a vent plug 161. Segment 121 further includes a passage 130 which receives attachment 127. Segment 121 also defines an interior buoyancy chamber 141 which is in communication with vent aperture 151. Correspondingly, segment 122 defines a vent aperture 152 receiving a vent plug 162 and defining an interior buoyancy chamber 142. By further similarity, segment 123 defines a vent aperture 153 receiving a vent plug 163. Segment 123 further defines an interior buoyancy chamber 143. Segment 124 defines a vent aperture 154 receiving a vent plug 164 and a buoyancy chamber 144. Segment 125 defines a vent aperture 155 receiving a vent plug 165. Segment 125 further defines a buoyancy chamber 145. Finally, segment 126 defines a vent aperture 156 receiving a vent plug 166. Segment 126 further defines a buoyancy chamber 146 and a passage 149.

To facilitate the attachment of flexible line 140 to segments 121 through 126, a plurality of passages are formed between adjacent segments. Thus, passages 136 and 137 extend between segments 121 and 122 while passage 138 and 139 extend between segments 122 and 123. Similarly, passages 147 and 148 extend between segments 123 and 124 while passages 157 and 158 extend between segments 124 and 125. Finally, passages 167 and 168 extend between segments 125 and 126. An attachment 159 suitable for supporting a hook is received within passage 149 while a similar attachment 179 is received within a passage 161 formed in segments 126 and 124 respectively. A plurality of generally flat plates 171 through 176 are secured to one side of segments 121 through 126. Plates 171 through 176 conform generally to the silhouettes of their respective segments 121 through 126 and are secured in a water tight attachment using adhesive or the like.

As mentioned above, fishing lure 110 utilizes a plurality of moveable weights 195, 196, 197 and 198 supported on their lower portions of segments 121, 122, 123 and 124 respectively. Weights 195 through 198 are shown movable within weight recepticles 190, 191, 192 and 193 formed on the lower edges of segments 121, 122, 123 and 124. Thus, for example weight 195 is movable back and forth within weight receptacle 190 in the manner indicated by arrow 210. Similarly, weight 196 is movable within weight receptacle 191 in the manner indicated by arrows 21 while weight 197 is movable within weight receptacle 192 in the manner indicated by arrows 212 and weight 198 is movable within weight receptacle 193. The attachment of weights 195 through 198 within their respective receptacles is fixed by utilization of a conventional water tight adhesive or other equivalent methods of attachments. The important aspect to note is that the user is able to adjust the buoyancy and center of buoyancy of fishing lure 110 using one or more of weights 195 through 198 and adjusting the relative positions thereof within their respective segments.

As mentioned above, fishing lure 110 also differs from fishing lure 10 shown above in that a plurality of additional vent apertures 220, 221 and 223 are formed within segments 122, 123 and 124. Thus, in addition to water entering buoyancy chambers 142, 143 and 144 via the bores within vent plugs 162, 163 and 164, addition water enters through apertures 220, 221 and 223. In this manner, the rate of filling of buoyancy chambers 142, 143 and 144 is increased and the change of center of buoyancy and total buoyancy of fishing lure 110 is further varied. It will be apparent to those skilled in the art that additional vent apertures may be fabricated within each and every one of segments 121 through 126 without departing from the spirit and scope of the present invention.

In operation, in accordance with the above-described performance, fishing lure 110 when casts into a body of water performs in a manner similar to that described for fishing lure 10. However, the presence of weights 195, 196, 197 and 198 produces a more rapid descent for fishing lure 110. In addition, the movement of water upwardly through slots 131, 132 and 133 due to the angular characteristic of the intersegment slots causes the above-mentioned increased water flow into buoyancy chambers 142, 143 and 144. Accordingly, with vent apertures 220, 221 and 223 fabricated within segments 122, 123 and 124 fishing lure 110 may be expected to sink more rapidly than fishing lure 10 set forth and described above. Additionally, the positioning of weights 195 through 198 will further alter the buoyancy of characteristics of fishing lure 110. As in the above-described performance of fishing lure 10, the angular characteristic of slots 131 through 135 produces the above-described action in which water flows upwardly into slots 131 through 135. Accordingly, the lower portions of each forward edge of segments 122, 123, 124, 125 and 126 engage the surrounding water as fishing lure 110 moves through the water. Once again the flexible coupling provided by flexible line 140 allows body 111 of fishing lure 110 to bend and flex in the water thereby exposing varying portions of the frontal edges of segments 122 through 126 creating a turning or twisting characteristic for fishing lure 110.

FIG. 10 sets forth a section view of fishing lure 110 taken along section lines 10-10 in FIG. 9. It will be noted that from examination of FIG. 10 that fishing lure 110 exhibits substantially the same trapezoidal cross section as fishing lure 10 set forth above in FIG. 7. Accordingly, fishing lure 110 includes a segment 123 having generally planar plates 173 and 183 joined thereto. Plates 173 and 183 provide closure of a buoyancy chamber 143 within the interior of segment 123. Additionally, segment 123 defines a vent aperture 153 within which a vent plug 163 is received. Segment 123 further includes passages 147 and 148 which, as is better seen in FIG. 9, receive flexible line 140. The lower interior portions of plates 173 and 183 together with segment 123 form a weight receptacle 192 within which a weight 197 is secured. As mentioned above, weight 197 may be moved within receptacle 192 and affixed therein using conventional water tight adhesive attachment or other suitable attachment.

What has been shown is a controllable fishing lure fabricated of a plurality of segments joined by flexible linkages there between. The segments are generally arranged in a linear array and support a plurality of fish hooks and provide for attachment at the frontal portion of the array to a suitable fishing line for casting activities. The segments are arranged in a spaced linear arrangement such that angularly oriented slots are formed between each of the segments which in turn produces a novel water interacting behavior characteristic of the inventive fishing lure. The inventive lure may be fabricated of wood or other suitable material. It is contemplated that a plastic material, preferably buoyant, may be used to mold the various segments of the present invention fishing lure. It is further contemplated that other material may be utilized such as wood composites or the like to fabricate the segments of the present invention fishing lure. Thus, a variety of materials are contemplated which may be used in fabricating the present invention fishing lure without departing from the spirit and scope of its inventive character.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. A fishing lure comprising:
 a plurality of body segments each defining an internal buoyancy chamber, a forward edge, a rearward edge, a top edge and a bottom edge;
 at least one flexible line joining said body segments in a spaced generally linear array to form a lure body characterized by a plurality of body slots formed between rearward and forward edges of successive adjacent ones of said body segments and defining a primary front-to-back axis;
 a first plurality of vent apertures formed in selected ones of said body segments in communication with said buoyancy chambers;
 at least one fish hook attached to at least one of said body segments; and
 a fishing line attachment secured to one of said body segments,
 said forward and rearward edges of said body segments being angled with respect to said primary front-to-back axis such that said slots are angled forwardly and downwardly.

2. The fishing lure set forth in claim 1 wherein said body segments are buoyant in water defining a center of buoyancy and wherein selected ones of said body segments include a weight receptacle having a weight received therein.

3. The fishing lure set forth in claim 2 wherein said weight receptacles are disposed along said segment bottom edges and said weights are secured within said weight receptacles.

4. The fishing lure set forth in claim 3 wherein said weights are position adjustable within said weight receptacles to change said center of buoyancy.

5. The fishing lure set forth in claim 3 wherein selected ones of said body segments define a second plurality of vent apertures in communication with said buoyancy chambers and wherein said selected ones of said body segments further include a plurality of removable vent plugs each defining a passage therethrough and each being received within said first plurality of vent apertures.

6. The fishing lure set forth in claim 5 wherein said body segments are formed of wood and said weights are formed of metal.

7. The fishing lure set forth in claim 6 wherein said second vent apertures of said selected ones of said plurality of body segments are located upon said forward edges thereof.

8. The fishing lure set forth in claim 7 wherein said forward edges each define a lower portion exposed when said body flexes which engages water as said fishing lure moves therein.

9. The fishing lure set forth in claim 1 wherein said forward edges each define a lower portion exposed when said body flexes which engages water as said fishing lure moves therein.

10. A fishing lure comprising:
 a plurality of body segments flexibly linked in a generally linear array and each body segment defining an internal buoyancy chamber, a forward edge, a rearward edge, a top edge and a bottom edge, said body segments defining slots therebetween;
 a first plurality of vent apertures formed in selected ones of said body segments in communication with said buoyancy chambers;
 at least one fish hook attached to at least one of said body segments; and
 a fishing line attachment secured to one of said body segments,
 said forward and rearward edges of said body segments being spaced to form said slots and said slots being angled with respect to said linear array such that said slots are angled forwardly and downwardly.

11. The fishing lure set forth in claim 10 wherein said body segments are buoyant in water defining a center of buoyancy and wherein selected ones of said body segments include a weight receptacle having a weight received therein.

12. The fishing lure set forth in claim 11 wherein said weight receptacles are disposed along said segment bottom edges and said weights are variously position adjustable within said weight receptacles.

13. The fishing lure set forth in claim 12 wherein selected ones of said body segments each define a second vent aperture in communication with said buoyancy chambers thereof and wherein said selected ones of said body segments each further include a removable vent plug each plug defining a passage therethrough and each being received within one of said first plurality of vent apertures.

* * * * *